May 26, 1925.
H. B. BUCKHAM
CONVEYING APPARATUS
Original Filed June 12, 1920    2 Sheets-Sheet 1
1,538,925
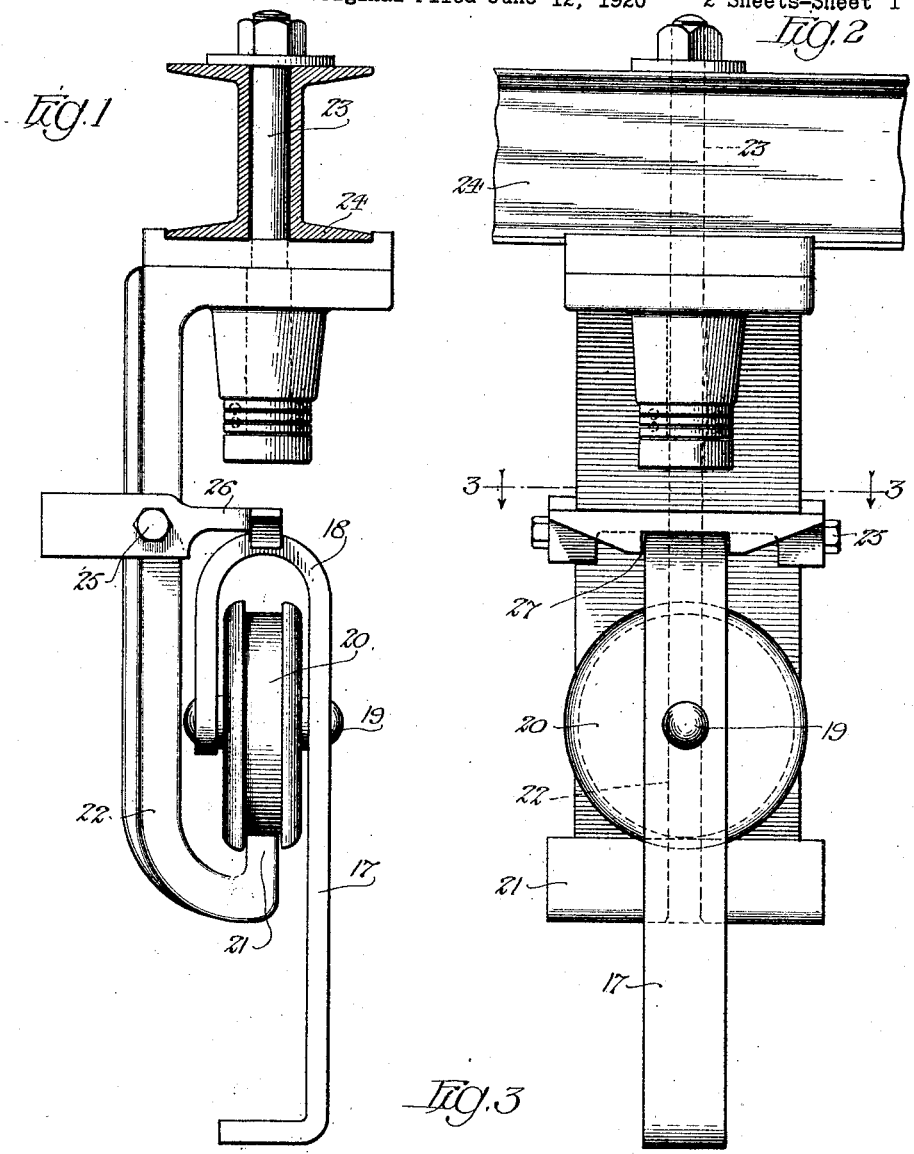
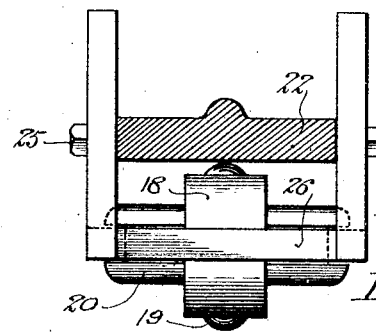

May 26, 1925.
H. B. BUCKHAM
CONVEYING APPARATUS
Original Filed June 12, 1920　　2 Sheets-Sheet 2
1,538,925
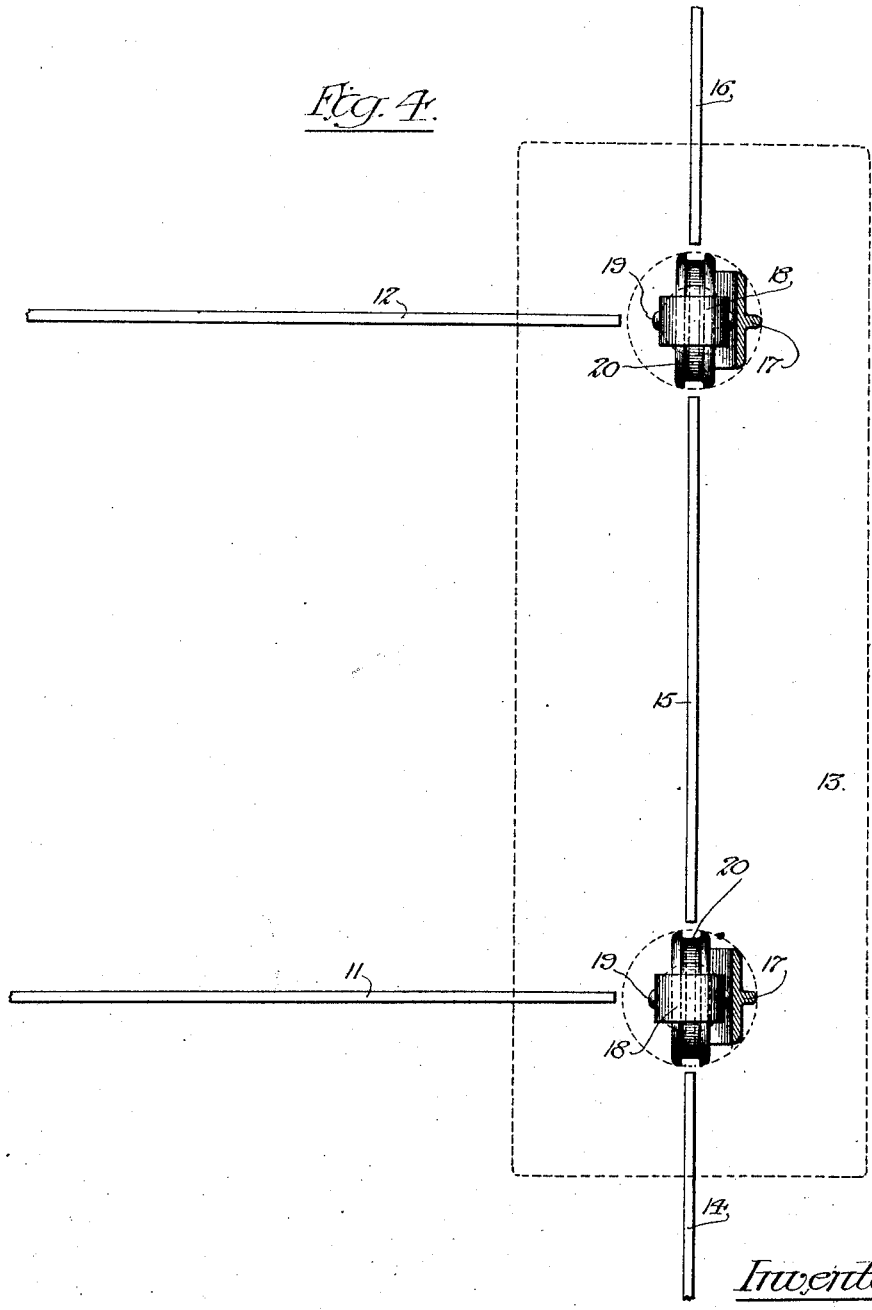

Patented May 26, 1925.

1,538,925

UNITED STATES PATENT OFFICE.

HENRY B. BUCKHAM, OF CHICAGO, ILLINOIS, ASSIGNOR TO THE ALLBRIGHT-NELL COMPANY, OF CHICAGO, ILLINOIS, A CORPORATION OF ILLINOIS.

CONVEYING APPARATUS.

Original application filed June 12, 1920, Serial No. 388,504. Now Patent No. 1,481,790, dated January 29, 1924. Divided and this application filed December 27, 1920. Serial No. 433,087.

*To all whom it may concern:*

Be it known that I, HENRY B. BUCKHAM, a citizen of the United States, residing in Chicago, in the county of Cook and State of Illinois, have invented a new and useful Improvement in Conveying Apparatus, of which the following is a specification.

This invention relates to conveying apparatus, and has for an essential object the provision of an exceedingly simple and efficient structure, whereby a container supported by said apparatus may be transferred from one portion thereof to another portion, and imparted a change of direction, without bodily swinging movement of the container.

In addition to the general object recited above, the invention has for further objects such other improvements or advantages in construction and operation as are found to obtain in the structures and devices hereinafter described or claimed.

In the accompanying drawings, forming a part of this specification, and showing, for purposes of exemplification, a preferred form and manner in which the invention may be embodied and practiced, but without limiting the claimed invention specifically to such illustrative instance or instances:

Figure 1 is a side elevational view of a transfer device, employed in a conveying mechanism constructed in accordance with the present improvements;

Fig. 2 is a front elevational view of the same;

Fig. 3 is a horizontal section taken in a plane indicated by the line 3—3 of Fig. 2; and Fig. 4 is a plan view, illustrating diagrammatically the conveying mechanism and the operation of the transfer devices.

The same characters of reference indicate the same parts throughout the several views.

In its present embodiment, the invention is incorporated in a conveying mechanism that is especially designed for use in a drying apparatus, such as disclosed in my copending application for Letters Patent for drying apparatus filed June 12, 1920, Serial No. 388,504, now Patent 1,481,790, granted January 29, 1924, of which this application is a division.

Features of construction are, however, readily adaptable to other valuable applications; consequently, the scope of the invention is not confined to the specific use and specific embodiment herein described as an illustrative example.

Referring to the drawings, there is illustrated a pair of parallel track rails 11 and 12 by which a container, indicated diagrammatically at 13, may be supported and moved therealong from the delivery to the discharge end of the apparatus in which the conveyer system or mechanism is employed. At either the delivery or the discharge end of the aforesaid track rails 11 and 12, there is provided a plurality of track rails, in the present instance three such rails, arranged end to end with respect to each other and respectively designated by the reference characters 14, 15 and 16. The said rails 14, 15 and 16 extend longitudinally of the delivery or discharge end of the aforesaid pair of rails 11 and 12, but transversely with respect to said rails 11 and 12.

The container 13 for supporting the material to be conveyed through the system is provided with a pair of trolley supports 17, respectively pivotally mounted on the top of the container. As shown more particularly in Figs. 1 and 2, each such trolley support 17 is conveniently constructed of a bar 18 suitably pivoted to the upper end of the container, so as to swing on a vertical axis with respect thereto, and provided with an inverted U-shaped portion 18 at the upper end of said bar, said portion 18 constituting a yoke having bearings 19 for the support of a trolley wheel 20. With this construction, the container 13 may be moved in directions parallel with either its sides or its ends. That is to say, when the trolley supports 17 are rotated so that the horizontal axes 19 of the trolley wheels are parallel with each other, the container may be moved in a direction parallel with its sides and along a single track or tracks positioned end to end with respect to each other, such as the tracks 14, 15 and 16 illustrated in Fig. 4. On the other hand, if the trolley supports 17 are turned so that the axes 19 are in line with each other and the trolley wheels are parallel with each other, the container may be moved in a direction parallel with its ends and along a double track such as the pair of parallel rails 11 and 12.

In their movement to be delivered to the pair of rails 11 and 12, or to be discharged therefrom, the container travels along a single trackway constituted of the rails 14, 15 and 16, and in transferring the container 13 from the before mentioned single trackway to the double trackway consisting of the rails 11 and 12, it is necessary that the direction of movement of the container be shifted to one approximately at right angles with respect to its former direction of movement. Such shift in the direction of movement of the container is effected, in accordance with the present invention, without bodily movement of the container. In order to effect transfer of the container from a single trackway to a double trackway or vice versa, there are provided on the opposite ends of the rails 11 and 12 and between the contiguous ends of the alined rails 15 and 16 and 14 and 15 short rail sections 21, each of which, as shown in Figs. 1 and 2, is pivotally hung, so that the rail section 21 may be swung from positions in alinement with the rails 14, 15 and 16 into positions in alinement with the rails 11 and 12, or vice versa.

Referring more particularly to Figs. 1, 2 and 3, each rail section 21 is formed at the bottom of a bracket 22 that is pivotally suspended from a spindle 23 hung from a beam 24 located above the junction point of the alined rails with the parallel rails. Pivoted at 25 on the opposite end edges of the bracket 22 is a clip 26 having a recess 27 for receiving the upper end of the trolley support 17, when the latter is supported by a rail section 21, to prevent the trolley wheel 20 from rolling off the rail section 21 during the swinging movement of the bracket 22.

The operation of transferring a container from the single trackway to the pair of tracks 11 and 12, and vice versa, is as follows: The container is pushed or otherwise propelled along the single trackway constituted of the rails 14, 15 and 16, until the trolley wheels have been respectively moved on to the swingable rail sections 21. When positioned on the rail sections 21, the cage is locked against movement by means of the clips 26. Thereupon the brackets 22 are swung to move the rail sections 21 respectively in alinement with the parallel rails 11 and 12. Such swinging movement of the brackets 21 causes the trolley supports 17 at the opposite ends of a container to swing independently of the container and to turn the trolley wheels 20 into parallelism with each other and into respective alinement with the tracks 11 and 12. After this has been accomplished, the clips 26 are released and the container may be readily moved off the rail sections 21 and on to the pair of parallel rails 11 and 12. In transferring the container from the parallel rails 11 and 12 to the alined rails 14, 15 and 16, the operation is exactly the reverse of that above described.

The invention as hereinabove set forth is embodied in a particular form of construction, but may be variously embodied within the scope of the claims hereinafter made.

I claim:

1. The combination with a single trackway of a fixed double trackway having one end in juxtaposition with respect to said single trackway, a container movable on both said trackways, means for suspending said container from said trackways, said means being adjacent each end of said container to maintain said container in alignment with said single trackway, and means for permitting the transfer of the container from one character of trackway to the other.

2. An overhead conveyor system embodying a sectional single trackway, a pivoted switch rail interposed between adjacent sections of said single trackway, a double trackway disposed at an angle to the aforesaid trackway and operable in conjunction therewith, means for permitting the swinging of said rail section from a position in alignment with one of said trackways into a position in alignment with the other, a container suspended from adjacent each of its ends and movable on both of said trackways, and means for suspending said container from said trackways, whereby said container may be transferred from one of said trackways to the other while being maintained against swinging movement.

3. The combination with a container suspended from adjacent each end, of a pair of trolley wheel supports pivotally mounted on vertical axes on said container, trolley wheels carried by said supports, a single trackway comprising alined rail sections on which the trolley wheels of the container travel when said trolley wheels are in alinement with each other, a double trackway operable in conjunction with said single trackway and pivoted rail sections located at the junction of the double trackway with the single trackway, said pivoted rail sections being adapted to support the trolley wheels of the container and swing said trolley wheels and their supports into position wherein the trolley wheels are parallel with each other whereby the container may be transferred from the single trackway to the double trackway, without bodily swinging movement of the container, substantially as specified.

4. The combination with a single trackway, of a double trackway having one end in juxtaposition with respect to said single trackway, a container suspended from adjacent both ends and movable on both said trackways; and means, interposed between said trackways for permitting the transfer of said container from one track-way to the other, without turning the container; substantially as specified.

5. A trolley wheel support for an overhead conveyer system, comprising a wheel-supporting member pivotally suspended on a vertical axis and provided with a trolley-track, and means carried by said member for preventing movement of a trolley wheel on said track, during pivotal movement of said member, said means having a locking engagement with the trolley wheel carriage; substantially as specified.

6. A trolley wheel support for an overhead conveyor system, comprising a wheel supporting member pivotally suspended on a vertical axis, said wheel supporting member comprising an elongated inturned supporting member having said trolley track formed as an integral portion thereof, and means carried by said wheel supporting member for preventing movement of a trolley wheel on said track.

7. The combination with a container of a pair of trolley wheel supports and a pair of container supports, said wheel supports being provided with track sections, and the container supports carrying a carriage for cooperation with a movable section of said track sections, said wheel supports and container supports being offset with respect to one another to permit the movement of the container supports past the wheel supports, and a locking clip carried by each of said wheel supports and adapted to engage each side of said carriage to prevent movement of said carriage on said movable track section.

8. An overhead conveyor system embodying trackways extending in directions transversely to each other, a pivoted track section adjacent to the point of intersection of said trackways and selectively movable into alignment with both of said trackways, said section being carried by a bracket member which is disposed at one side of said section, a wheeled carriage cooperating with said trackways and provided with a depending supporting bracket which is disposed at the other side of said section to permit of the interrupted passage of said carriage along said trackways and said track section, and a movable abutment mounted on said bracket member and adapted to prevent movement of said carriage in either direction while opposite said track section.

HENRY B. BUCKHAM.